United States Patent

Hanyu

(10) Patent No.: US 6,561,816 B1
(45) Date of Patent: May 13, 2003

(54) CARD CONNECTOR WITH RESILIENT GROUNDING CONTACT

(75) Inventor: Takuji Hanyu, Tokyo (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/228,448

(22) Filed: Jan. 11, 1999

(30) Foreign Application Priority Data

Jan. 23, 1998 (JP) .......................................... 10-026710

(51) Int. Cl.⁷ .......................... H01R 12/00; H05K 1/00
(52) U.S. Cl. ................................................. 439/64
(58) Field of Search ............................................ 439/64

(56) References Cited

U.S. PATENT DOCUMENTS

| | | | |
|---|---|---|---|
| 5,297,966 A | * 3/1994 | Brennian, Jr. et al. | 439/64 |
| 5,308,251 A | * 5/1994 | Kaufman et al. | 439/64 |
| 5,357,402 A | * 10/1994 | Anhalt | 439/64 |
| 5,511,986 A | * 4/1996 | Casey et al. | 439/64 |
| 5,588,850 A | * 12/1996 | Pan et al. | 439/64 |
| 5,613,860 A | * 3/1997 | Banakis et al. | 439/64 |
| 5,934,951 A | * 8/1999 | Lai et al. | 439/876 |

* cited by examiner

*Primary Examiner*—Khiem Nguyen
*Assistant Examiner*—Hae Moon Hyeon
(74) *Attorney, Agent, or Firm*—A. A. Tirva; Stacey E. Caldwell

(57) ABSTRACT

Disclosed is a small-sized card connector for use in connecting a printed circuit board and a card having an integrated circuit contained therein. The card connector includes an insulating housing having two opposite guide sections extending from a connector section. Each guide section has a resilient contact fixed thereto with a contact section exposed in the guide slot. The resilient contact is soldered to the grounding circuit of the printed circuit board.

The card includes a shield extending therearound. When the shielded longitudinal edges of the card are inserted in the guide slots of the card connector and the card is moved forward, the contact sections of the resilient contacts yieldingly deflect, thus keeping the shield of the card at ground potential to assure that the integrated circuit and the printed circuit are protected against electrostatic hazards.

5 Claims, 6 Drawing Sheets

CARD CONNECTOR WITH RESILIENT GROUNDING CONTACT

FIELD OF THE INVENTION

The invention is directed to a card connector for connecting a printed circuit board and a card and, more particularly, to such a card connector equipped with means for preventing electric circuits from being broken electrostatically when an electric connection is made between a printed circuit board and a card.

BACKGROUND OF THE INVENTION

As is known, when it is desired to make an electric connection is between an electronic device having a printed circuit board and a card having an integrated circuit, a card connector can be used to make the connection between the card and the printed circuit board simply by inserting the card in a card connector.

Such a card connector typically includes an insulating housing having a pair of guide sections to guide the card into a mating position with the card connector. Also, the card connector may have means to disconnect and eject the card therefrom, and a card-protecting shell to prevent the card from any exterior hazards.

When a person inserts a card in the card connector by hand, there is a fear of the integrated circuit of the card and/or the printed circuit board of the electronic device being electrostatically destroyed by permitting static electricity to be discharged from the hand to the card and/or the electronic device. To prevent such an electrostatic hazard, the card connector can include grounding means to allow static electricity to be discharged from the person to the grounding circuit of the printed circuit board of the electronic device.

Typically, such a grounding means comprises a contacting section that makes contact with an electrically conductive shield which surrounds the top, bottom and opposite sides of the connector-mating section of the card, and a separate grounding section that makes an electric connection between the contacting section and the grounding circuit of the printed circuit board of the electronic device.

Such grounding means, however, is not effective if a good electric connection is not made between the contacting section and the grounding section. The contacting section of the grounding means may be integrally formed to project in a cantilever fashion from the card-ejection means or slider (both made of electrically conductive material) or from the metal shell of the card connector. The cantilever-like projection of the card-ejection means or slider is made to slide on a grounding member of the card when the card is inserted in the card connector. This arrangement may eventually cause a poor electric connection between the cantilever-like projection and the card grounding member particularly in applications where the card connector is used for repeated insertions of a card.

As is known, there is an ever increasing demand for reducing the physical size and manufacturing cost of such card connectors. However, to meet this demand, there is a corresponding risk of lowering the reliability of the anti-electrostatic hazard means. Such a grounding means is assembled from two separate parts (i.e., contacting section and grounding section), and accordingly the assembly and manufacturing costs can be high.

SUMMARY OF THE INVENTION

An object of the present invention is to provide a small-sized card connector whose anti-electrostatic hazard reliability is substantially improved in spite of reducing significantly the manufacturing cost. To obtain this object, a card connector for use in making a required electric connection between a printed circuit board and a card having an integrated circuit, the card connector including an insulating housing comprising a connector section which mates with a mating connector section of the card, a pair of guide sections to guide the mating connector section of the card to the connector section of the card connector and grounding means to ground the card to the grounding conductor of the printed circuit board via the card connector, is improved according to the present invention in that the grounding means is provided in at least one of the guide sections; and the grounding means comprises a resilient contact comprising:

a contact section projecting in the guide slot of the guide section, wherein opposite guide slots face toward each other to accommodate opposite longitudinal sides of the card in guiding the mating connector section of the card to the connector section of the card connector, thus permitting the projecting contact section to contact at least one longitudinal side of the card; and a grounding section integrally connected to the contact section, which grounding section is adapted to be connected to the grounding circuit of the printed circuit board.

The resilient contact comprises a contact section and a grounding section integrally connected to the contact section, such an integral structure effectively eliminates the possibility of causing insufficient grounding that would occur if the grounding structure were made of separate parts. Such possibility of incomplete grounding would be increasingly noticeable as the size of the card connector is decreased. The use of the integral grounding structure, therefore, contributes to the down-sizing of the card connector.

The resilient contact may comprise a contact section and a grounding section integrally connected thereto, and may be fixed by inserting a contact-to-grounding transitional base of the resilient contact into the seat of one of the guide sections, the seat having an opening to permit the contact section of the contact to project into the guide slot.

The grounding section of the resilient contact comprises a planar fitting nail adapted to be surface soldered to the grounding circuit of the printed circuit board.

Other objects of the present invention will be understood from the following description of a card connector according to a preferred embodiment of the present invention.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFFERED EMBODIMENT

Figure 1:
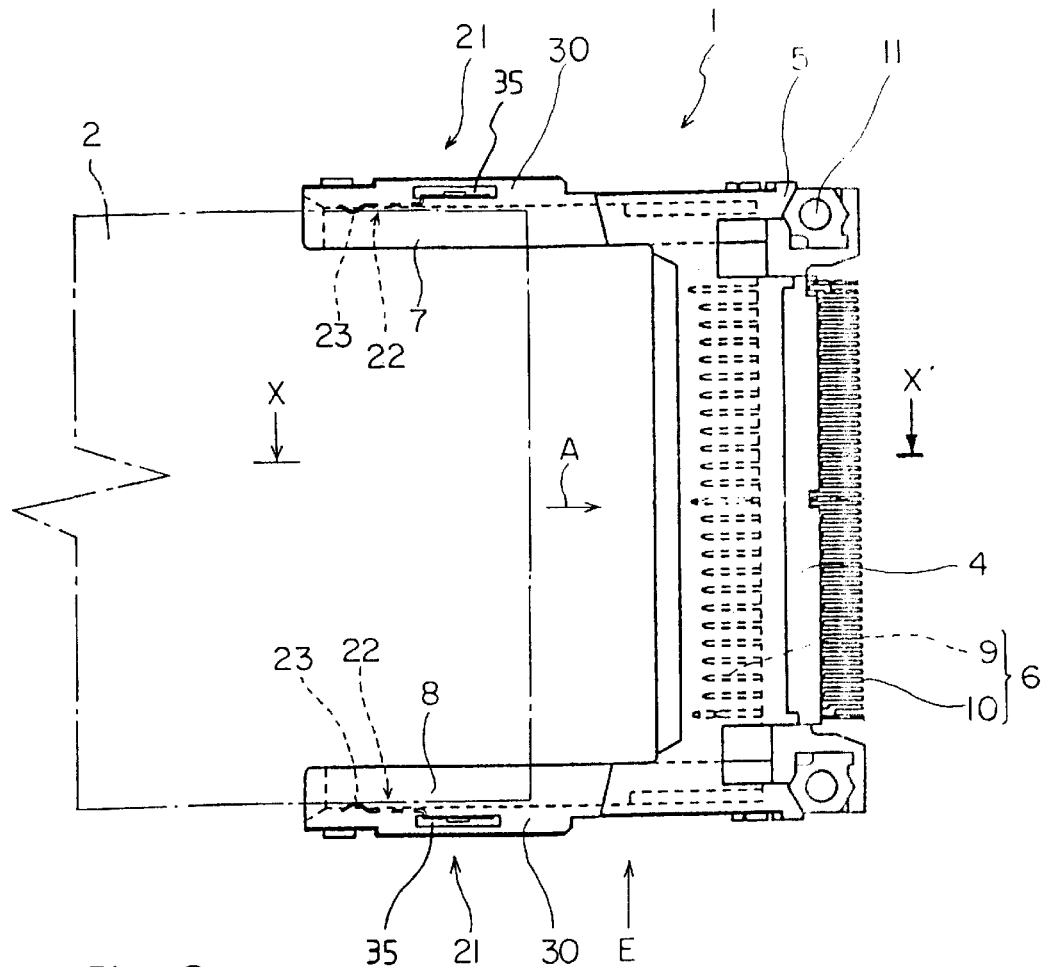
FIG. 1 is a plan view of a card connector structure according to the present invention.
Figure 2:
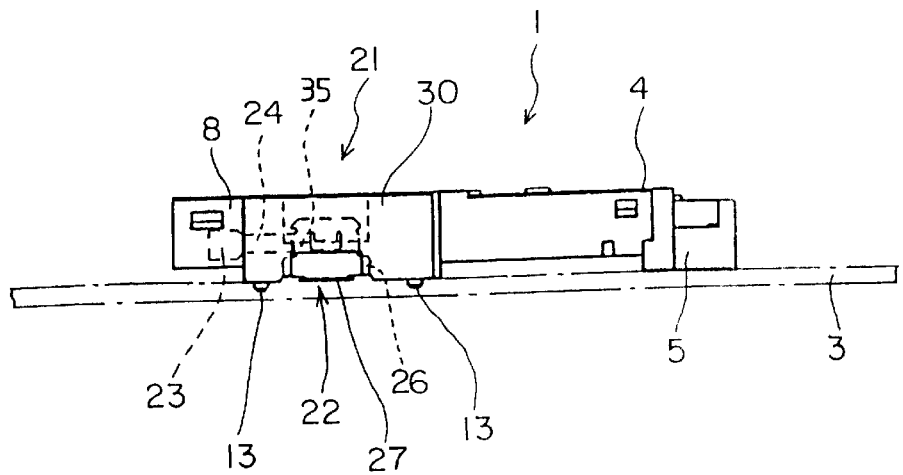
FIG. 2 is a side view of the card connector structure as viewed in the direction indicated by arrow E in Fig. 1.
Figure 3:
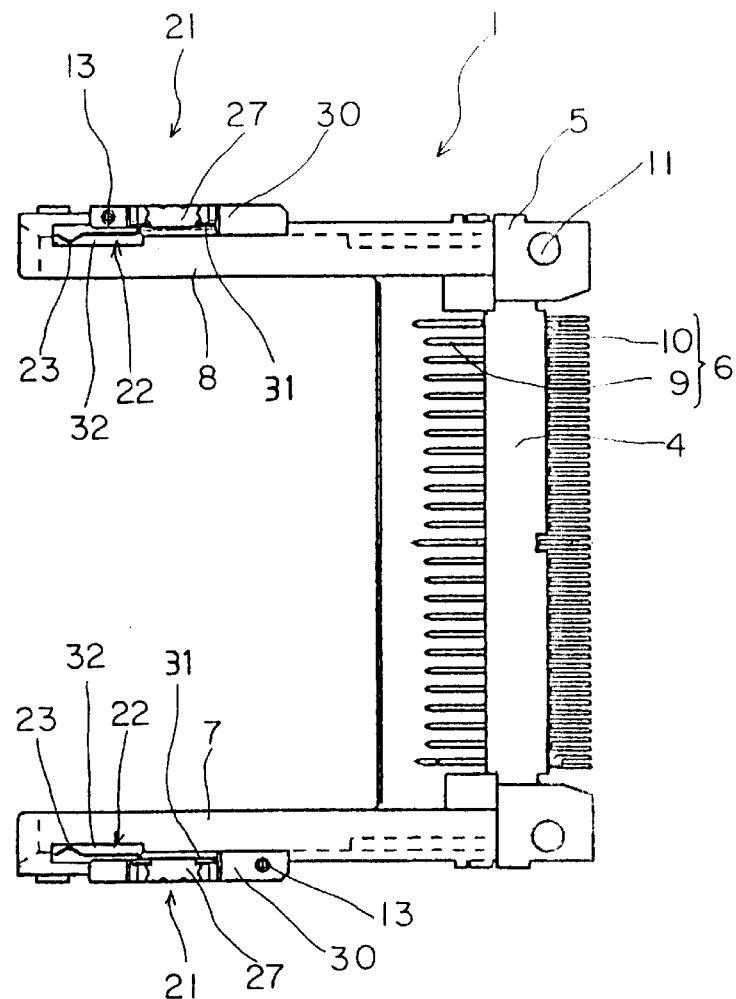
FIG. 3 is a bottom view of the card connector structure.

Referring to the accompanying drawings and first to FIGS. 1 through 3, a card connector 1 can be used in making an electric connection between a printed circuit board 3, which can be part of an electronic device for example, and a card 2 having an integrated circuit, such as a memory, contained therein. Such a card 2 is commonly called "PC Card" or "CF Card" and it includes a mating connector section to be mated with the connector section of the card connector. The mating connector section of card 2 has an electrically conductive shield substantially entirely enclosing its surrounding surface (that is, its top, bottom and opposite sides).

Card connector 1 includes an insulating housing 5 comprising a connector section 4 to mate with the mating connector section of card 2 and a pair of guide sections 7 and 8 to guide the mating connector section of card 2 to connector section 4 of card connector 1. Housing 5 is molded from plastic or other insulating materials.

Connector section 4 has a plurality of terminals 6 arranged at regular intervals. Each terminal 6 is composed of a contact section 9 to be connected to the corresponding mating pin of the mating connector section of card 2, and a soldering tail section 10 to be soldered to a corresponding conductor on the underlying printed circuit board 3.

Figure 4:
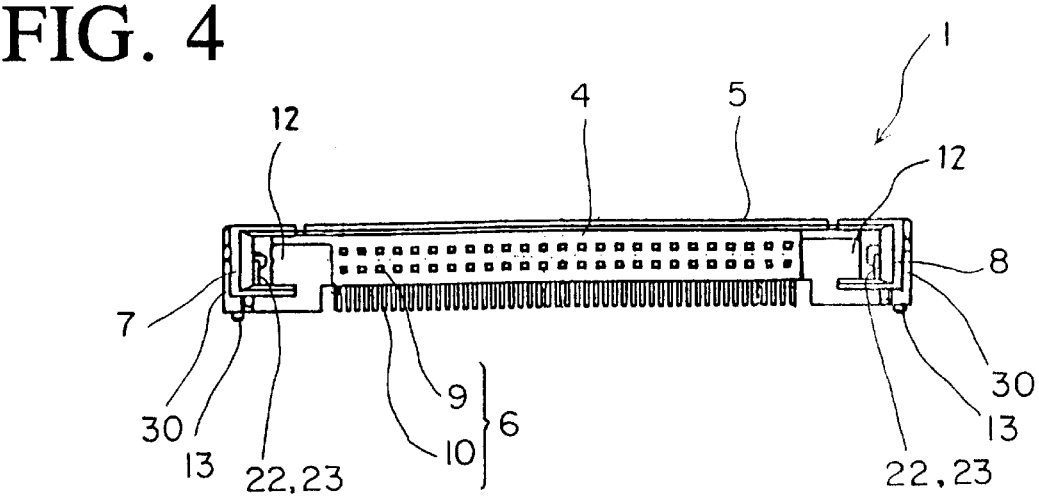
FIG. 4 shows the card connector structure viewed from the side from which a card can be inserted therein.

As seen in FIG. 4, the pair of guide sections 7 and 8 are provided on opposite lateral sides of connector section 4 with their guide slots 12 facing toward each other. Portions of these guide sections 7 and 8 appearing symmetrically relative to the longitudinal center line in FIGS. 3 and 4 are indicated by the same reference numerals.

Housing 5 includes positioning projections 13 and fixing apertures 11 thereby facilitating the positioning and fixing of housing 5 in printed circuit board 3.

Figure 5:
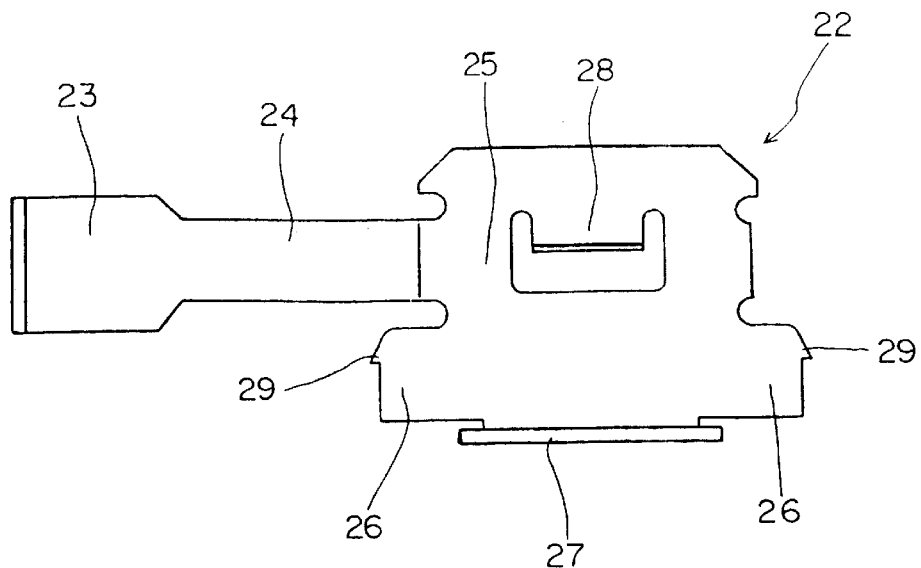
FIG. 5 is a plan view of a resilient contact of the type used in the card connector structure.
Figure 6:
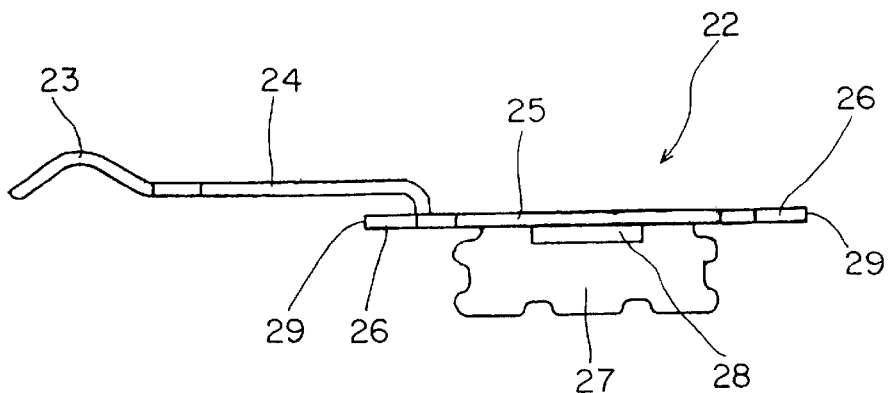
FIG. 6 is a side view of the resilient contact shown in FIG. 5.
Figure 7:
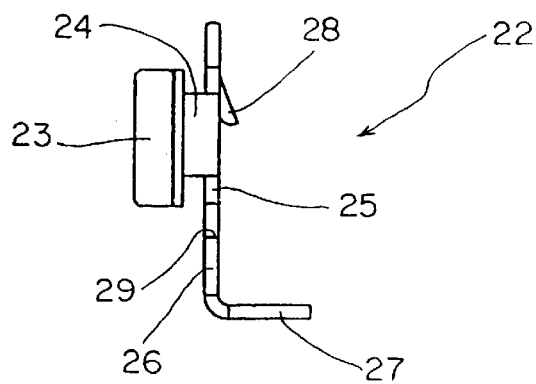
FIG. 7 is an end view of the resilient contact as seen from the left side in FIG. 5.

Now, the features of the card connector 1 according to the present invention are described. Each guide section 7 or 8 has a grounding means 21 to ground card 2 to a corresponding grounding conductor of printed circuit board 3 composed of a resilient contact 22 comprising a contact section 23 projecting in guide slot 12 of guide section 7 or 8 and a grounding section 27 integrally connected to the contact section 23, which is adapted to be connected to a grounding circuit of printed circuit board 3. As seen in FIGS. 5 to 7, resilient contact 22 has a contact section 23 and a grounding section 27 both integrally connected to a base 25 of the contact.

Specifically, contact section 23 is connected to base 25 via an elongate arm 24, which is parallel with the base 25. Contact section 23 is bent to form a ridge whereas the grounding section 27 rises upright from the base edge.

Resilient contact 22 is fixed by inserting its contact-to-grounding transitional base 25 into a seat 30 of guide section 7 or 8. Seat 30 includes an insertion slot 3, a retainer 35, an opening 32 and another opening 34 made therein as seen in FIGS. 9, 10, 11 and 12. The contact-to-grounding transitional base 25 of resilient contact 22 is inserted into insertion slot 31 until the tongue-like engagement projection 28 is caught by retainer 35, allowing the grounding section 27 to be exposed in opening 34, and, at the same time, allowing contact section 23 to project from opening 32 in guide slot 12. Thus, grounding section 27 can be easily soldered to the grounding circuit of printed circuit board 3, and resilient contact 22 can contact one or the other longitudinal side of card 2 when the card is inserted in opposite card slots 12 of insulating housing 5.

Referring still to FIGS. 5, 6 and 7, resilient contact 22 is adapted to be fixed in guide section 8, and is symmetrical with the resilient contact fixed in the guide section 7, and is described in more details below.

As described above, resilient contact 22 includes a contact section 23 and a grounding section 27 both integrally connected to a base 25, and is made of a sheet of metal by stamping and forming. Contact section 23 extends from base 25 in a cantilever style, and the free end of the flexible cantilever is formed with a ridge as seen in FIG. 6.

Grounding section 27 can be a fitting nail-like piece extending from the lower edge of base 25 to provide a soldering surface, which is adapted to be soldered to the grounding circuit of printed circuit board 3.

Grounding section 27 can also be an extension adapted to be inserted in a through hole of the printed circuit board.

Base 25 of resilient contact 22 has an engagement projection 28 made by cutting the mid-portion of the base in the shape of a "U", and by forming the projection 28 so as to be caught by the retainer 35 of seat 30. Also, base 25 has two push-in expansions 26, and each push-in expansion 26 has a throng-like projection 29 to make sure that resilient contact 22 is positively fixed to insulating housing 5.

Resilient contact 22 has contact and grounding parts combined as an integral form, thereby assuring that the card connector 1 is free of any poor electric connection therebetween, which would be caused in the conventional card connector having contact and grounding parts provided separately, and assuring that the associated printed circuits are free of electrostatic hazards.

Now the manner in which a pair of resilient contacts 22 are fixed to the guide section 7 and 8 of the insulating housing 5 is described by giving an example of resilient contact 22 being fixed to guide section 8.

Figure 8:
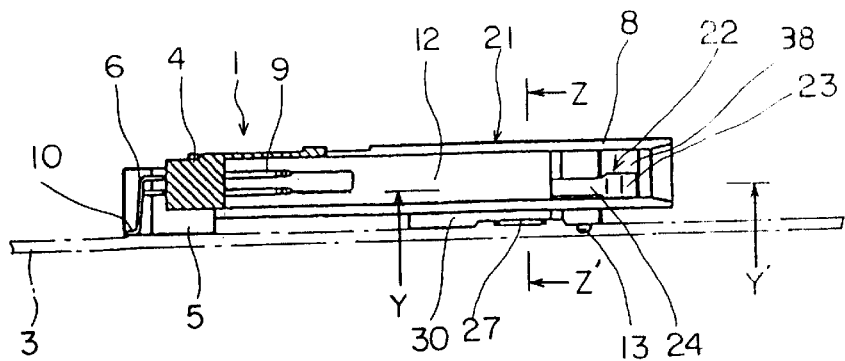
FIG. 8 is a longitudinal section of the card connector structure taken along the line X–X' in FIG. 1.

Referring to FIG. 8, resilient contact 22 is fixed to guide section 8 so that contact section 23 of resilient contact 22 may be exposed in guide slot 12 with the ridge of contact section 23 as directed toward the opening side of guide slot 12. Thus, contact section 23 projects into guide slot 12. Recess 38 is seen behind contact section 23. Contact section 23 can be withdrawn in recess 38 when it is yieldingly deflected backward by the longitudinal edges of card 2 during insertion thereof.

Figure 9:
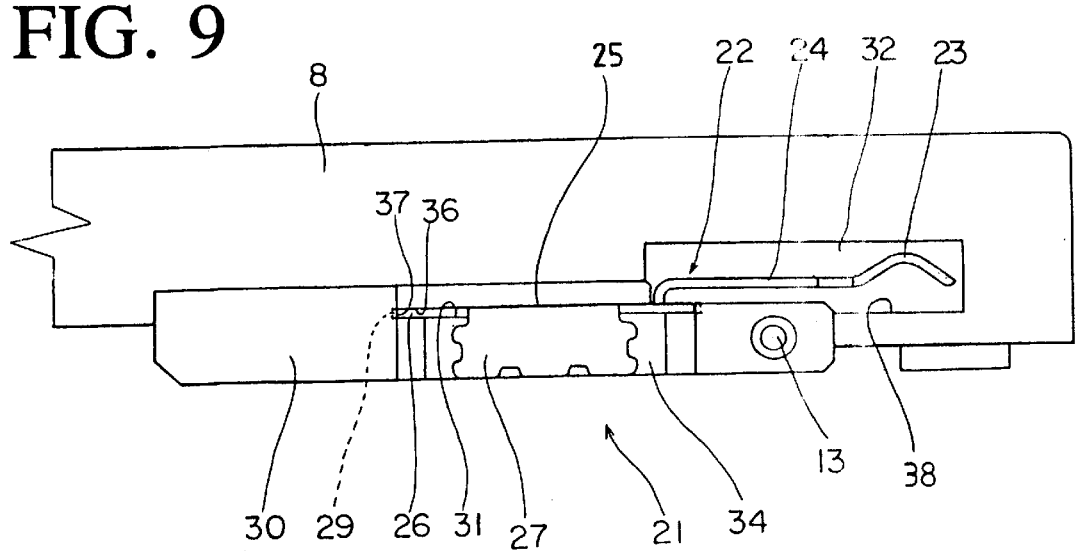
FIG. 9 is an enlarged bottom view of a fragmentary part of one side of the card connector structure corresponding to the section shown in FIG. 8.
Figure 10:
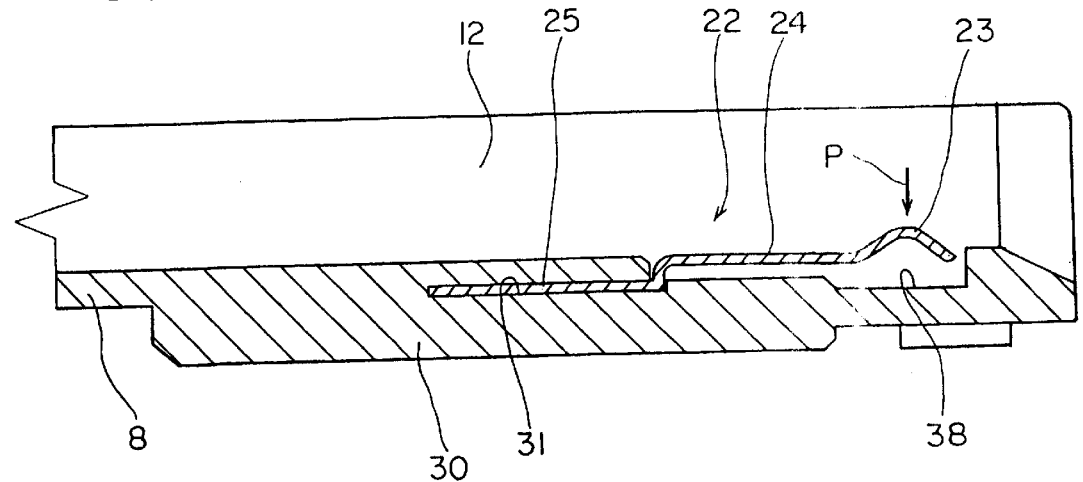
FIG. 10 is an enlarged section of the fragment of the card connector structure taken along line Y–Y' in FIG. 8.

Referring to FIGS. 9 and 10, resilient contact 22 is fixed to seat 30 by inserting base 25 into slot 31 (whose width is somewhat larger than the thickness of resilient contacts 22)

made in seat 30, and by putting elongated arm 24 and contact section 23 in opening 32, which communicates with slot 31 and recess 38.

Figure 12:
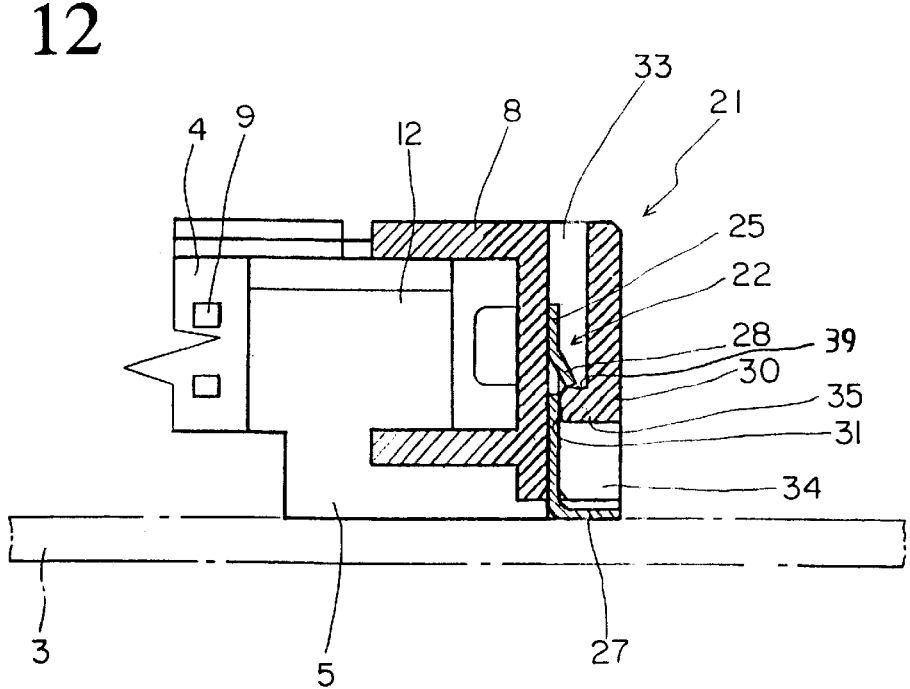
FIG. 12 is an enlarged cross section of the card connector structure taken along line Z–Z' of FIG. 8.

As seen in FIG. 12, tongue-like engagement projection 28 of base 25 of resilient contact 22 abuts an upper surface 39 of retainer 35 of seat 30.

Figure 13:
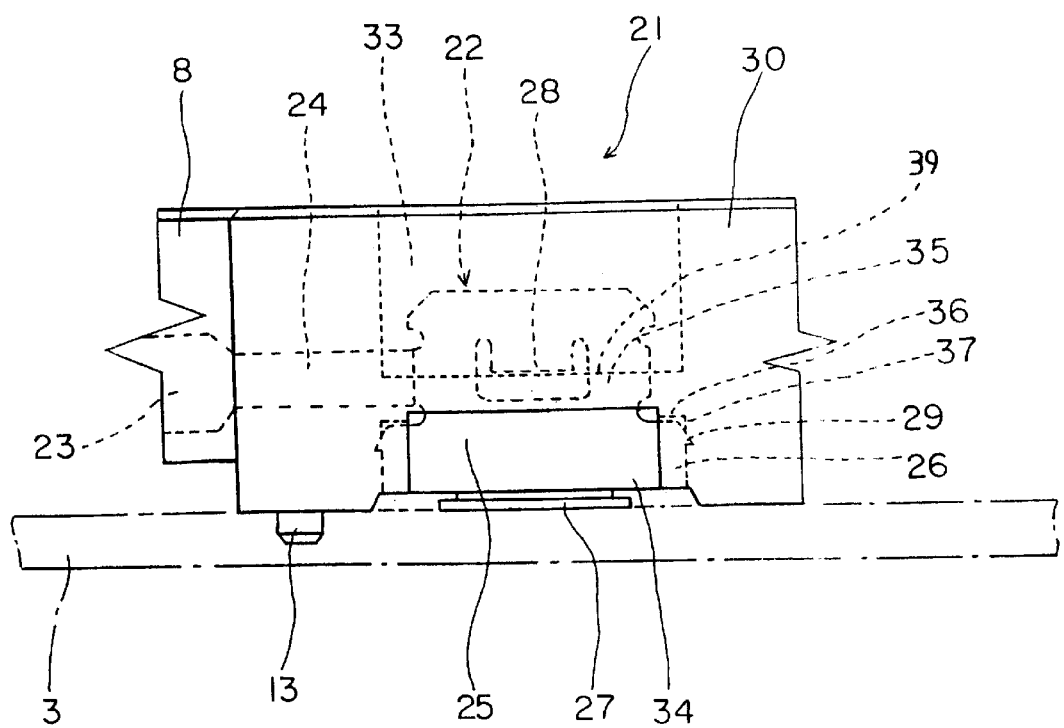
FIG. 13 is an enlarged view of the part of the card connector structure to which a resilient contact is attached.

As seen in FIG. 13, opposite push-in expansions 26 are forcedly pushed in longitudinal extensions 36 of slot 31 (see FIG. 9), permitting projections 29 to cut into end walls 37 of longitudinal extensions 36.

Thus, resilient contact 22 can be fixed steadily to guide section 8 with engagement projection 28 and push-in expansions 26 of base 25 both caught by the inner surface of seat 30.

Now the manner in which card connector 1 is fixed to the underlying printed circuit board is described. First, card connector 1 is put on printed circuit board 3 in the correct position with the aid of positioning projections 13 of insulating housing 5, and then card connector 1 is bolted to printed circuit board 3 by inserting screws in fixing apertures 11. Thereafter, solder tails 10 of terminals 6 of connector section 4 are soldered to corresponding conductors of printed circuit board 3, and at the same time, the grounding fitting nails 27 of resilient contacts 22 are soldered to the grounding circuit of printed circuit board 3.

A card 2 is inserted into card connector 1 with its connector section facing connector section 4 of the card connector, and its opposite longitudinal edges are inserted in guide slots 12 of opposite guide sections 7 and 8 of card connector 1. Then card 2 is moved toward connector section 4 of card connector 1 in the direction indicated by arrow A in FIG. 1.

Upon insertion of the card, contact section 23 of resilient contact 22, which project in guide slots 12, make contact with the shielded longitudinal edges of the card.

Figure 11:
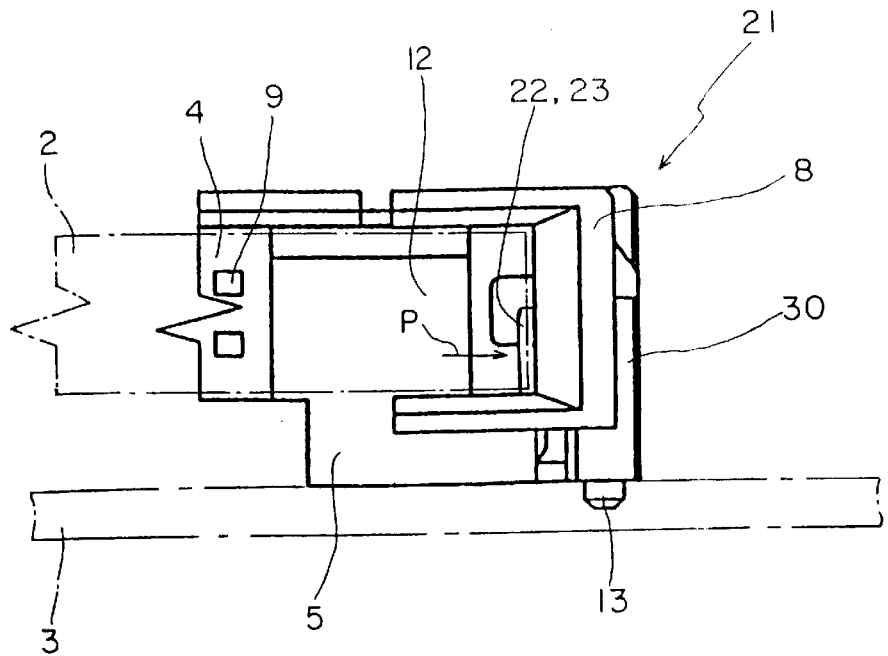
FIG. 11 is an enlarged end view of the card connector structure as seen from the right side of FIG. 8.

Contact sections 23 of resilient contacts 22 are yieldingly deflected, as indicated by arrow P in FIG. 11, to enter the recesses 38 (see FIG. 9), allowing the contact sections to continuously abut against the shielded longitudinal edges of card 2 with a given contact pressure to assure continuous contact therebetween.

With this arrangement, static electricity from a persons body can be discharged to the grounding circuit of the printed circuit board through the electrically conductive shield of the card and the resilient contacts. Thus, the integrated circuit of card 2 and/or the printed circuit of the printed circuit board can be protected against electrostatic hazards. The reliability of the protection is improved by the use of the integral contact and-grounding combination and by the continuous contact with the shielded longitudinal edges of the card.

Also, the increased protection reliability against electrostatic hazards permits the down-sizing of the card connector, and the decreased number of parts in the grounding means leads to a significant decrease in the number of assembling steps, and the corresponding decrease in the manufacturing costs of the connector.

The shielded longitudinal edges of the card make contact with the contact sections of the resilient contacts, so that the shield of the card is grounded all the time, assuring that required EMC be provided in the connector assembly.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A card connector for connecting a printed circuit board and a card having an integrated circuit comprising an insulating housing including
a connector section for receiving a mating connector section of the card,
a pair of guide sections on opposite lateral sides of the connector section to guide the card rearwardly into mating engagement with the connector section of the card connector, each guide section including an insertion slot and a guide slot formed therein, and
a resilient grounding contact mounted in each guide section for grounding the card to a grounding circuit of the printed circuit board,
characterized in that the resilient grounding contact comprises
a generally planar base section mounted in the insertion slot of the guide section of the insulating housing,
a contact arm formed integrally with a forward side of and extending generally parallel to and forward from the base section and located in the guide slot of the guide section, wherein opposite guide slots face toward each other to accommodate opposite sides of the card in guiding the mating connector section of the card rearwardly into mating engagement with the connector section of the card connector; and
a grounding section formed generally perpendicular to the base section and the contact arm for connection to the grounding circuit of the printed circuit board.

2. A card connector according to claim 1 wherein the contact arm of the grounding contact extends generally parallel to the insertion slot of the guide section and includes a generally C-shaped contact section formed at a distal end thereof.

3. A card connector according to claim 1 wherein the base section of the resilient grounding contact includes a U-shaped opening formed therein wherein the bight portion of the opening extends generally parallel to the base section of the grounding contact.

4. A card connector according to claim 3 wherein a projection is formed-in the base section opposite the bight portion of the U-shaped opening and extending above the grounding section interengage with walls of the insertion slot of the guide section to fix the resilient contact within the insulating housing.

5. A card connector according to claim 1 wherein the base section further includes two outwardly extending expansions each having an outwardly extending projection which interengage with front and rear portions of walls of the insertion slot of the guide section to fix the resilient contact within the insulating housing.

* * * * *